(12) United States Patent
Tanaka

(10) Patent No.: US 6,781,603 B2
(45) Date of Patent: Aug. 24, 2004

(54) IMAGE DISPLAY METHOD AND APPARATUS

(75) Inventor: Nobuyuki Tanaka, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 179 days.

(21) Appl. No.: 09/988,279

(22) Filed: Nov. 19, 2001

(65) Prior Publication Data

US 2002/0060658 A1 May 23, 2002

(30) Foreign Application Priority Data

Nov. 21, 2000 (JP) ........................................ 2000-353863

(51) Int. Cl.$^7$ .............................. G09G 5/10; A61B 8/00
(52) U.S. Cl. ......................... 345/690; 345/89; 382/132; 600/443; 378/4
(58) Field of Search .......................... 345/89, 690–699; 600/443; 378/4; 382/132

(56) References Cited

U.S. PATENT DOCUMENTS

| | | | | |
|---|---|---|---|---|
| 5,539,432 A | * | 7/1996 | Kobayashi | 345/600 |
| 5,732,705 A | * | 3/1998 | Yokoyama et al. | 600/443 |
| 6,134,351 A | * | 10/2000 | Waki et al. | 382/252 |

FOREIGN PATENT DOCUMENTS

| | | | |
|---|---|---|---|
| JP | 3-277357 A | * | 12/1991 |
| JP | 4-187142 A | * | 7/1992 |
| JP | 5-168622 A | * | 7/1993 |
| JP | 2976196 | | 9/1999 |

OTHER PUBLICATIONS

Abstract 10–153830 Jun. 9, 1998.

* cited by examiner

Primary Examiner—Amr Awad
(74) Attorney, Agent, or Firm—Sughrue Mion, PLLC

(57) ABSTRACT

An image display apparatus wherein, in the process of receiving and successively displaying a plurality of image data representing a plurality of pictures, a previously displayed image can be distinguished from a next image easily and the outline of the previously displayed image can be grasped. The image display apparatus includes: a data receiving unit for receiving a plurality of image data; an image data generating unit for generating overwritten image data at predetermined intervals; a look-up table altering unit for altering gradation processing condition of the first image data and setting that of the overwritten image data; an image processing unit for executing gradation processing of the first image data in accordance with the altered condition and executing gradation processing of the overwritten image data in accordance with the set condition; and a display unit for displaying the first picture and displaying an overwritten picture.

8 Claims, 5 Drawing Sheets

IMAGE DISPLAY METHOD AND APPARATUS

BACKGROUND OF THE INVENTION

1. Field of the Invention

The present invention relates to an image display method of displaying images obtained by radiography and so on, and to an image display apparatus using the same.

2. Description of a Related Art

Photography using radiations (X-rays, α-rays, β-rays, γ-rays, electron rays, ultraviolet rays and so on) has hitherto been used in a variety of fields, and especially in the medical field it becomes one of indispensable measures for diagnoses. X-ray radiography has had a lot of improvements since its first realization and now combining fluorescent screen and X-ray film is the mainstream. On the other hand, with various digitalized apparatuses such as X-ray CT, ultrasonic diagnosis, MRI and so on realized in recent years, diagnostic information processing systems are being structured in hospitals. With a lot of researches conducted to digitize X-ray images, radiography using photostimulable phosphor has been established and put into practical use to replace X-ray radiography.

Photostimulable phosphor (accumulative phosphor) is such a substance as follows. That is, the substance accumulates a part of the radiation energy when radiation is irradiated. After that, when excitation light such as visible light and so on is irradiated, the substance radiates photostimulated luminescence light in accordance with the accumulated energy. Existence of photostimulable phosphor has been known so far. The radiography using photostimulable phosphor is as follows. That is, a radiation image of an object like a human body is photographed and recorded on a sheet coated with photostimulable phosphor. Since photostimulated luminescence light is produced when the photostimulable phosphor sheet is scanned by excitation light such as a laser beam and so on, image data can be obtained by reading the light photo-electrically. After proper processing of the image data, a radiation image can be shown as a visible image on a display such as a CRT or on a film printed by a laser printer and so on.

The radiography compares with the conventional X-ray radiography in photographic sensibility and image quality. For example, compared with the conventional X-ray radiography, an exposure area is exceedingly wide and a response of photostimulated luminescence light is almost in proportion to an exposure amount in all the exposure area. Therefore, even if an object is photographed by any amount of radiation, image signals having proper gradation can be obtained by finding the luminous area of the image and normalizing it. Also with a proper process of image signals obtained by this way, the image having good quality can be produced under a variety of photographing condition. Moreover, it is possible to store a lot of image data set for a long time without deterioration of image quality because the image by this radiophotography can be stored as digitized data. Such a system storing images as image data sets will be useful to the development of medical diagnostic information system.

In medical diagnosis using a display such as a CRT and so on, a plurality of images are often displayed successively. In this case, a new image is displayed over an image previously shown or a new image is displayed after the previous one is eliminated. However, when the new image is displayed over the previous one, it is difficult to know where the previous image ends and where the new one starts because the two images are displayed on the same screen. Thus, there is a fear that the two images might be confused.

Japanese Patent No. 2976196 discloses a radiation image information reading and displaying apparatus which reads radiation images to obtain image data, successively displays images on the basis of those image data, and eliminates existing images previous to displaying images in accordance with reading the images.

In the above apparatus, it does not occur that a previous image and a next image are confused because only one image is displayed on one screen. However, in medical diagnosis, both the previous and next images are often observed as a series of images. For example, when the same part of a human body is photographed from different angles or at different times, it becomes difficult to realize the connection of the series of images if the previous one is eliminated.

SUMMARY OF THE INVENTION

The present invention was accomplished in view of such problems. An object of the present invention is to provide an image display method wherein, in the process of receiving and successively displaying a plurality of image data representing a plurality of pictures in order, a previously displayed image can be distinguished from a next image to be displayed easily and the outline of the previously displayed image can be grasped. Also, another object of the present invention is to provide an image display apparatus using the method.

In order to achieve the above object, an image display method according to the present invention comprises the steps of: (a) setting gradation processing condition of first image data representing a first picture; (b) executing gradation processing of the first image data in accordance with the gradation processing condition set at step (a); (c) displaying the first picture by using the first image data obtained at step (b); (d) altering the gradation processing condition set at step (a) when reception of second image data representing a second picture starts; (e) executing gradation processing of the first image data in accordance with the gradation processing condition altered at step (d); (f) receiving second image data representing a second picture in sequence; (g) generating overwritten image data at predetermined intervals by replacing a part of the first image data obtained at step (e) with a part of the second image data received at step (f); (h) setting gradation processing condition of the overwritten image data generated at step (g); (i) executing gradation processing of the overwritten image data in accordance with the gradation processing condition set at step (h); and (j) displaying an overwritten picture by using the overwritten image data obtained at step (i).

An image display apparatus according to the present invention comprises: first means for receiving a plurality of image data representing a plurality of pictures in sequence; second means for generating overwritten image data at predetermined intervals by replacing a part of first image data representing a first picture with a part of second image data representing a second picture; third means for altering gradation processing condition of the first image data representing the first picture being previously displayed, and thereafter setting gradation processing condition of the overwritten image data generated by the second means; fourth means for executing gradation processing of the first image data in accordance with the gradation processing condition altered by the third means, and thereafter executing gradation processing of the overwritten image data generated by the second means in accordance with the gradation processing condition set by the third means; and fifth means for displaying the first picture by using the first image data obtained by the fourth means, and thereafter displaying an overwritten picture by using the overwritten image data obtained by the fourth means.

According to the present invention, a new image is successively received and displayed after changing the gradation of a previously displayed one, so that the previous image and the new image are confused by no means and the outline of the previous image can be grasped.

DESCRIPTION OF THE PREFERRED EMBODIMENTS

Figure 1:
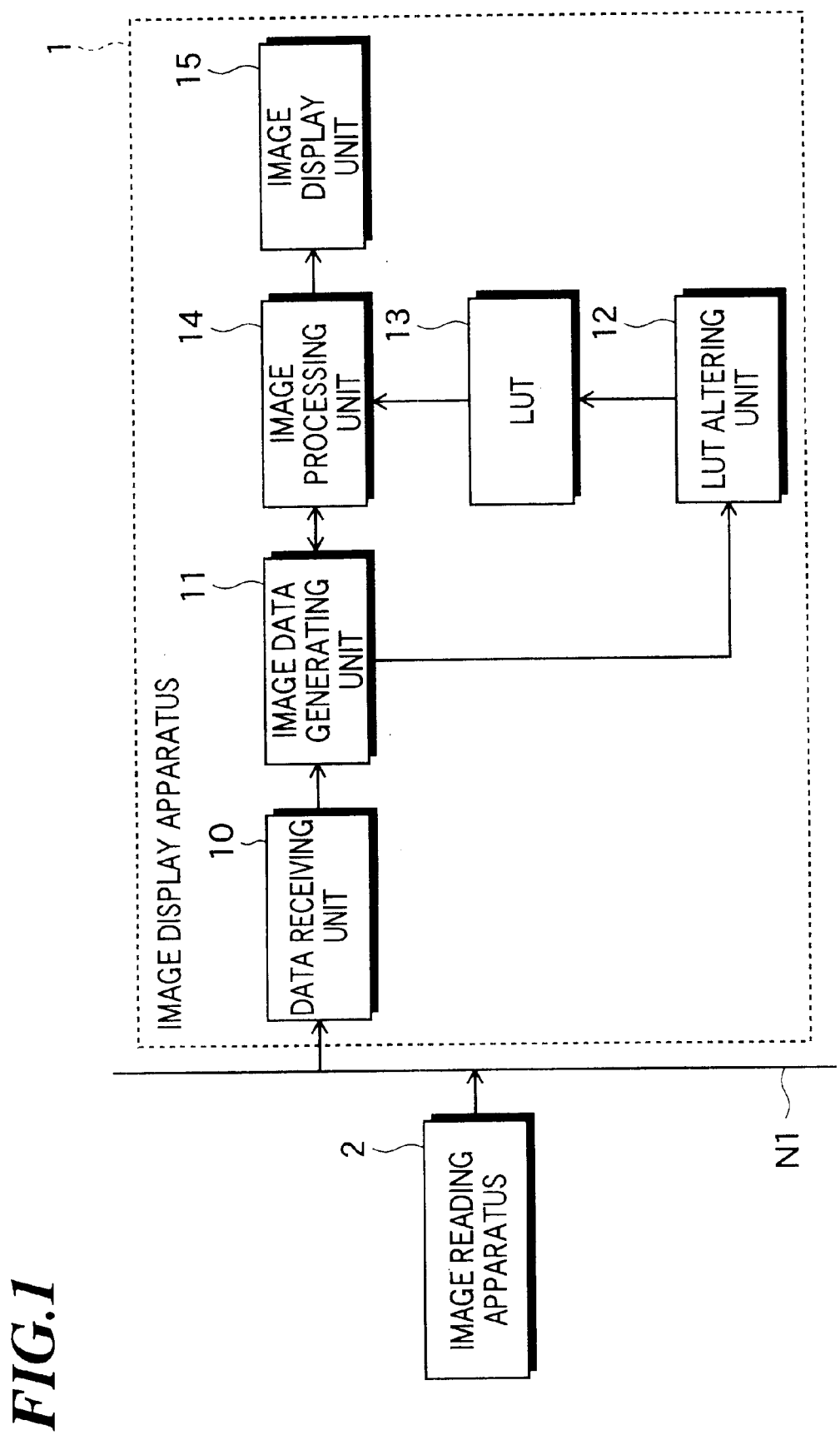
FIG. 1 is a block diagram showing the configuration of a medical image processing system including an image display apparatus according to one embodiment of the present invention.

Embodiments of the present invention will now be described in detail with reference to the drawings. The same constituent elements are designated by the same reference numerals and explanation thereof will be omitted.

FIG. 1 shows a configuration of a medical image processing system including an image display apparatus according to one embodiment of the present invention. In this embodiment, a record sheet (photostimulable phosphor sheet) for radiophotography is coated with photostimulable phosphor substance and records information of an object when it is irradiated by radiation.

In FIG. 1, an image display apparatus 1 and an image reading apparatus 2 are connected through a network N1. When the image information is recorded on the record sheet by radiophotography, the image information is first read from the record sheet by the image reading apparatus 2, and data generated from the read image information is transmitted to the image display apparatus 1. In the case of displaying pictures recorded on a plurality of record sheets successively, image data representing a new picture are transmitted from the image reading apparatus 2 to the image display apparatus 1 and the new picture is displayed over a previous picture while the previous picture is displayed in the image display apparatus 1.

Figure 2:
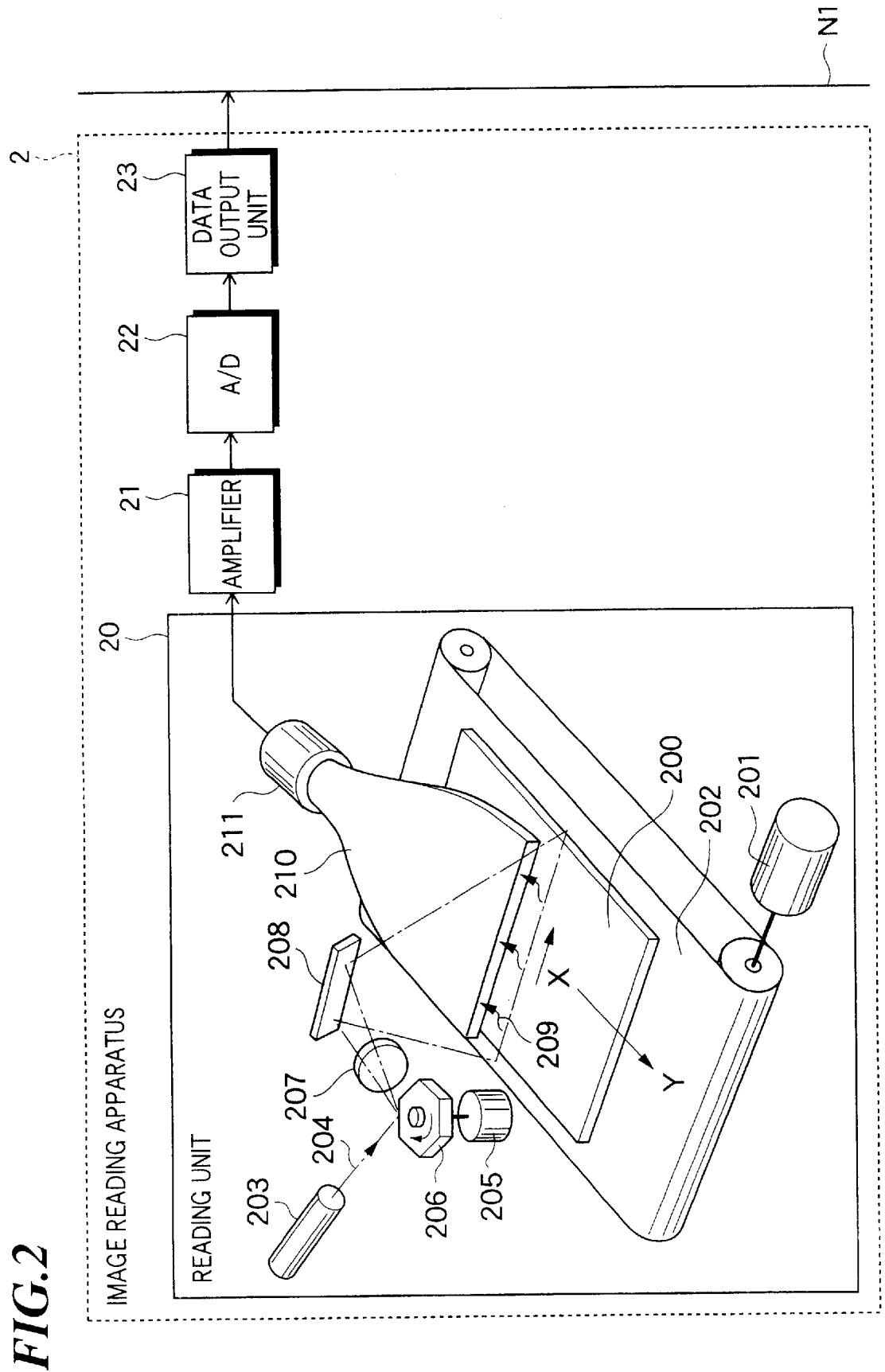
FIG. 2 is a diagram showing the configuration of an image reading apparatus as shown in FIG. 1.

Next, the operation of the image reading apparatus 2 is explained in detail with referring to FIG. 2. In FIG. 2, a record sheet 200 for recording radiation images is set at a predetermined place of the image reading apparatus. The record sheet 200 is carried in Y-direction by sheet conveyance means 202 driven by a motor 201. A beam 204 generated from a laser light source 203 is reflected and deflected by a rotation polygon mirror 206 which is driven by a motor 205 and turning at high speed in an arrow direction. Further, the beam 204 goes through a convergence lens 207. After that, an optical path of the beam 204 is altered by a mirror 208, so that the beam 204 is incident upon the record sheet 200 and scanned in X-direction. The excitation light 204 is irradiated to the record sheet 200 by the scanning, and photostimulated luminescence light 209 is generated from the irradiated site in accordance with accumulated and recorded radiation image information. The photostimulated luminescence light 209 is led by a light guide 210 and is photo-electrically detected by a photo multiplier 211. An analog signal output from the photo multiplier 211 is amplified by an amplifier 21 and digitized by an A/D converter 22. A data output unit 23 successively outputs digitized image data into the image display apparatus 1 as shown in FIG. 1 through the network N1.

Referring again to FIG. 1, a series of pixel data included in the image data that makes up a new picture is successively transmitted from the image reading apparatus 2 into a data receiving unit 10 of the image display apparatus 1. On the basis of the pixel data received by the data receiving unit 10, an image data generating unit 11 generates image data representing a whole picture and keeps them. A look-up table (LUT) 13 stores gradation processing condition to be used in gradation processing of image data. Also a look-up table (LUT) altering unit 12 rewrites the look-up table 13 to change gradation of the previously displayed picture or to display the new image data generated by the image data generating unit 11 in proper gradation. An image processing unit 14 executes gradation processing of the image data of the previous picture or the new picture, which is generated by the image data generating unit 11, in accordance with the gradation processing condition stored in the look-up table. Also the image processing unit 14 may perform various kinds of image processing besides the gradation processing. After displaying the previous picture by using the previous image data obtained by the image processing unit 14, an image display unit 15 displays a new picture over the previous one by using the new image data obtained by the image processing unit 14.

Figure 3:
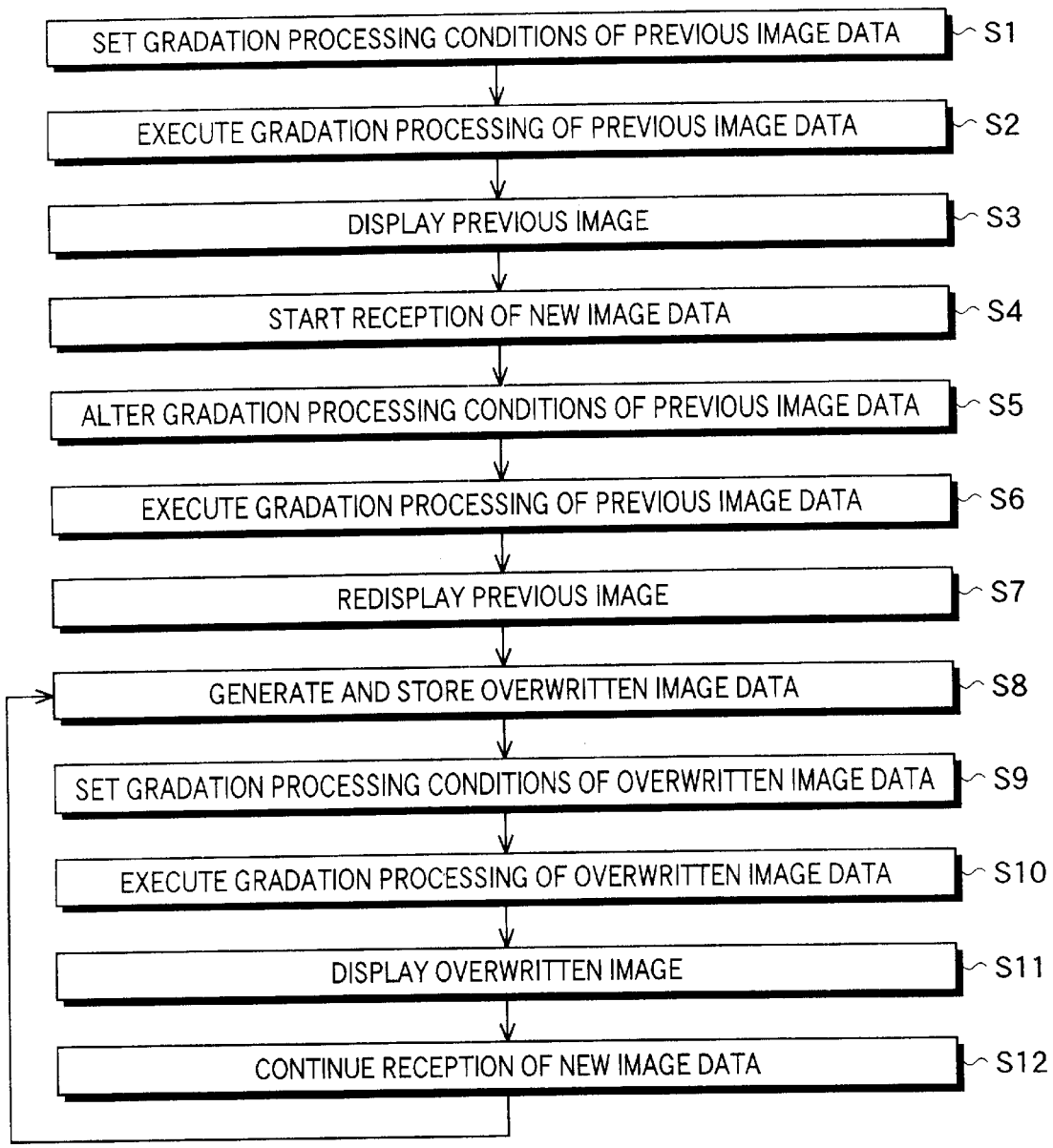
FIG. 3 is a flow chart showing an image display method according to one embodiment of the present invention.

Referring to FIGS. 1 and 3, detailed description will be made about the operation of the image display apparatus according to the embodiment. FIG. 3 is a flow chart showing an image display method according to the embodiment of the present invention.

At step S1, the previous image data read by the reading apparatus 2 and transmitted to the data receiving unit 10 is reconstructed as image data representing the whole picture in the image data generating unit 11, and its gradation processing condition is set by the look-up table altering unit 12 for rewriting data values of the look-up table 13. The data values of the look-up table may be set at fixed values beforehand so that the picture is displayed in proper gradation. Or properly values calculated in accordance with the image data representing the picture may be used for the data values of the look-up table.

At step S2, the image processing unit 14 executes gradation processing of the previous data in accordance with the set gradation processing condition, and at step S3, the image display unit 15 displays the previous image.

On the other hand, in the reading apparatus 2, the new image data representing the next picture is successively read, and at step S4, reception of the new image data into the data receiving unit 10 starts.

Figure 4A:
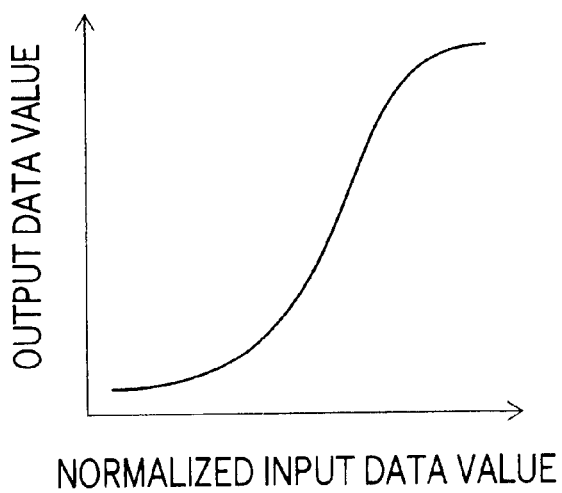
FIGS. 4A and 4B are graphs showing gradation characteristics implemented by a look-up table as shown in FIG. 1.
Figure 4B:
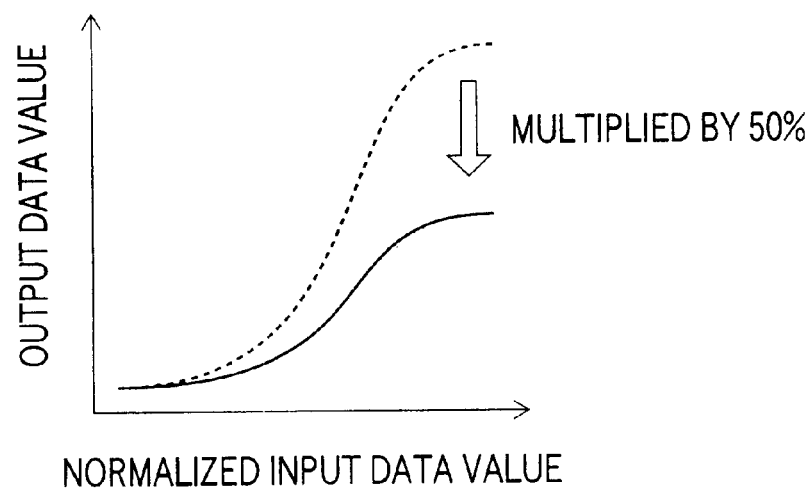

At step S5, with the new image data received, the look-up table altering unit 12 alters the gradation processing condition of the previous image data. The look-up table altering unit 12 writes values, which are produced by multiplying current data values in the look-up table by a predetermined rate, into the look-up table. As the multiplication rate, a fixed value set beforehand or a value input from outside may be used. FIG. 4A shows a curve of the gradation characteristics realized by a look-up table currently set. In FIGS. 4A and 4B, horizontal axes indicate normalized input data values and vertical axes indicate output data values respectively. For example, if the look-up table is rewritten with the above predetermined rate set at 50%, the curve that indicates the above gradation characteristics alters as shown in FIG. 4B.

At step S6, the image processing unit 14 executes gradation processing of the image data of the previous image displayed on a display, by using the altered look-up table 13. In this gradation processing, if the above-predetermined rate is set at 50% as shown in FIG. 4B, the brightness of the previous picture is lowered and the whole picture is displayed darkly. Also, it is possible to set the above-predetermined rate at more than 100% so as to heighten the brightness of the whole picture and to display it brightly.

At step S7, the image display unit 15 may redisplay once more the previous image in the changed gradation, by using the altered look-up table.

At step S8, the image data generating unit 11 generates overwritten image data by overwriting the new picture on the previous picture, by using the newly input image data representing the new picture, and stores the overwritten image data.

At step S9, the look-up table altering unit 12 rewrites the look-up table 13 to display the overwritten image data generated by the image data generating unit 11 in proper gradation. Next, at step S10, the image processing unit 14 executes gradation processing of the overwritten image data, by using the rewritten look-up table 13. Further, at step S11, the image display unit 15 displays the overwritten picture having proper gradation.

Furthermore the new image data is continually received at step S12 and the operations of steps S8 to S11 are repeated, then a rate of the new image successively is increased in the overwritten picture and a totally new image finally appears.

Figure 5:
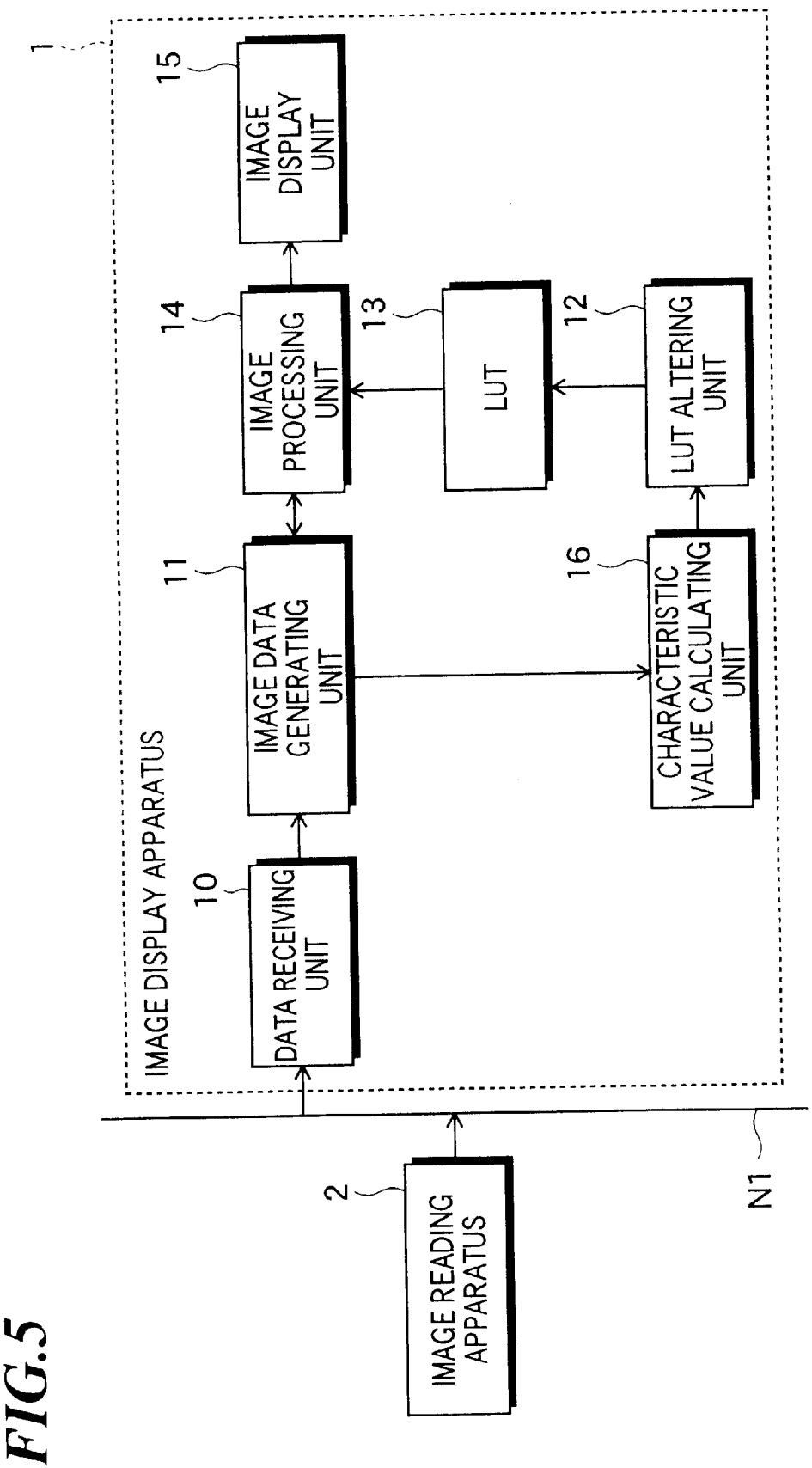
FIG. 5 is a block diagram showing the configuration of a medical image processing system including a variation of the image display apparatus according to one embodiment of the present invention.

As to setting the look-up table at step S9, the look-up table may be set at initial values while the overwritten image is successively being displayed, and altered by calculating the optimum value when the new picture is totally displayed. Also, the look-up table may be altered dynamically while the overwritten image data is successively generated so that the overwritten image is always displayed in proper gradation. In this case, as shown in FIG. 5, it is desirable to provide a characteristic value calculating unit 16 for calculating at least one characteristic value which characterizes the image data of the new picture such as an average value, a maximum value, or a minimum value, in accordance with input image data. Then, it is possible to find the optimum data values by the characteristic value calculating unit 16 and rewrite the look-up table successively.

Because the previous image is displayed more darkly or brightly than usual photographic images, it is easy to distinguish the previous image from the new one.

Both analog and digital circuits may be used for constituting the image data generating unit 11, the look-up table altering unit 12, the image processing unit 14 as shown in FIG. 1 and the characteristic value calculating unit 16 as shown in FIG. 5. Alternatively, a combination of central processing unit (CPU) and software may be used for constituting them. In this case, the software is recorded on a recording medium such as a hard disk, a floppy disk, MO, MT, CD-ROM, DVD-ROM and so on. The look-up table 13 may be constituted with a temporary storage medium such as a random access memory (RAM) and so on. The image display unit 15 may include a display such as a CRT and so on.

Although the network connects the image reading apparatus and the image display apparatus in FIG. 1, it is possible to directly connect the image reading apparatus and the image display apparatus, and directly input the image data read by a scanner into the image display apparatus.

As described above, according to the present invention, the new image is overwritten and successively displayed after changing the gradation of the previous image, it is easy to distinguish the new image from the previous one even when they are on the screen at the same time. Therefore, it is possible to distinguish the previous picture from the later one and to compare them even when a plurality of pictures are successively displayed.

What is claimed is:

1. An image display method comprising the steps of:
    (a) setting a gradation processing condition of first image data representing a first picture;
    (b) executing gradation processing of the first image data in accordance with the gradation processing condition set at step (a);
    (c) displaying the first picture by using the first image data obtained at step (b);
    (d) altering the gradation processing condition set at step (a) when reception of second image data representing a second picture starts;
    (e) executing gradation processing of the first image data in accordance with the gradation processing condition altered at step (d);
    (f) receiving second image data representing a second picture in sequence;
    (g) generating overwritten image data at predetermined intervals by replacing a part of the first image data obtained at step (e) with a part of the second image data received at step (f);
    (h) setting gradation processing condition of the overwritten image data generated at step (g);
    (i) executing gradation processing of the overwritten image data in accordance with the gradation processing condition set at step (h); and
    (j) displaying an overwritten picture by using the overwritten image data obtained at step (i).

2. An image display method according to claim 1, further comprising a step of redisplaying in different gradation the first picture displayed at step (c) by using the first image data obtained in accordance with the gradation processing condition altered at step (d).

3. An image display method according to claim 1, wherein step (d) includes altering the gradation processing condition by multiplying data values making up the gradation processing condition of the second image data by a predetermined rate.

4. An image display method according to claim 2, wherein step (d) includes altering the gradation processing condition by multiplying data values making up the gradation processing condition of the second image data by a predetermined rate.

5. An image display apparatus comprising:
    first means for receiving a plurality of image data representing a plurality of pictures in sequence;
    second means for generating overwritten image data at predetermined intervals by replacing a part of first image data representing a first picture with a part of second image data representing a second picture;

third means for altering a gradation processing condition of the first image data representing the first picture being previously displayed, and thereafter setting gradation processing condition of the overwritten image data generated by said second means;

fourth means for executing gradation processing of the first image data in accordance with the gradation processing condition altered by said third means, and thereafter executing gradation processing of the overwritten image data generated by said second means in accordance with the gradation processing condition set by said third means; and fifth means for displaying the first picture by using the first image data obtained by said fourth means, and thereafter displaying an overwritten picture by using the overwritten image data obtained by said fourth means.

6. An image display apparatus according to claim 5, wherein said fifth means redisplays in different gradation the first picture being previously displayed by using the first image data obtained in accordance with the gradation processing condition altered by said third means.

7. An image display apparatus according to claim 5, wherein said third means alters the gradation processing condition by multiplying data values making up the gradation processing condition of the second image data by a predetermined rate.

8. An image display apparatus according to claim 6, wherein said third means alters the gradation processing condition by multiplying data values making up the gradation processing condition of the second image data by a predetermined rate.

* * * * *